(12) United States Patent
Wechsler et al.

(10) Patent No.: US 12,077,057 B2
(45) Date of Patent: Sep. 3, 2024

(54) METHOD AND SYSTEM FOR COOLING OF AN INDUCTIVE POWER TRANSFER PAD

(71) Applicant: Bombardier Primove GmbH, Berlin (DE)

(72) Inventors: Simon Wechsler, Esslingen (DE); Roman Gunt, Heidelberg (DE); Robert Czainski, Zelona Góra (PL); Dominik Anders, Mannheim (DE)

(73) Assignee: ENRX IPT GMBH, Efringen-Kirchen (DE)

( * ) Notice: Subject to any disclaimer, the term of this patent is extended or adjusted under 35 U.S.C. 154(b) by 549 days.

(21) Appl. No.: 17/280,820

(22) PCT Filed: Sep. 27, 2019

(86) PCT No.: PCT/EP2019/076145
§ 371 (c)(1),
(2) Date: Mar. 26, 2021

(87) PCT Pub. No.: WO2020/064989
PCT Pub. Date: Apr. 2, 2020

(65) Prior Publication Data
US 2021/0339641 A1    Nov. 4, 2021

(30) Foreign Application Priority Data

Sep. 28, 2018 (GB) ..................... 1815941

(51) Int. Cl.
*B60L 53/302* (2019.01)
*B60L 53/122* (2019.01)

(52) U.S. Cl.
CPC ........... *B60L 53/302* (2019.02); *B60L 53/122* (2019.02)

(58) Field of Classification Search
CPC ...... B60L 53/302; B60L 53/122; B60L 53/10; B60L 53/30; B60L 53/12; Y02T 10/70;
(Continued)

(56) References Cited

U.S. PATENT DOCUMENTS

2001/0003416 A1* 6/2001 Kajiura ................... B60L 53/31
320/109
2004/0212784 A1* 10/2004 Hsu ........................ G03B 21/16
353/61
(Continued)

FOREIGN PATENT DOCUMENTS

CN 202889679 U 4/2013
CN 106233573 A 12/2016
(Continued)

OTHER PUBLICATIONS

First Office Action in JP2021517269, mailed May 2, 2023, 5 pages.
(Continued)

*Primary Examiner* — Stacy Whitmore
(74) *Attorney, Agent, or Firm* — ArentFox Schiff LLP

(57) ABSTRACT

The invention relates to an inductive power transfer pad (10), comprising a conductor arrangement (36) for generating or receiving an electromagnetic field during an inductive power transfer and an airflow generating system (37) that is configured to generate an airflow (22) during an inductive power transfer, said airflow (22) being directed into the surroundings of the inductive power transfer pad (10). Further, the invention relates to an arrangement (11) for an inductive power transfer and a method for cooling an inductive power transfer pad (10).

25 Claims, 4 Drawing Sheets

(58) Field of Classification Search
CPC ..... Y02T 10/7072; Y02T 90/12; Y02T 90/14; H05K 7/20863
See application file for complete search history.

(56) References Cited

U.S. PATENT DOCUMENTS

| | | |
|---|---|---|
| 2012/0203410 A1 | 8/2012 | Wechlin et al. |
| 2017/0047769 A1 | 2/2017 | Kim et al. |
| 2017/0129345 A1* | 5/2017 | Wechsler ............... B60L 53/302 |
| 2018/0160572 A1 | 6/2018 | Elias et al. |
| 2018/0251035 A1 | 9/2018 | Baumer et al. |
| 2018/0288898 A1 | 10/2018 | Jeong et al. |
| 2019/0074720 A1 | 3/2019 | Krammer |
| 2019/0241083 A1 | 8/2019 | Wechsler et al. |
| 2019/0241084 A1 | 8/2019 | Wechsler et al. |
| 2023/0300539 A1* | 9/2023 | Liang ..................... H04R 23/00 381/165 |
| 2023/0308810 A1* | 9/2023 | Liang ..................... H04R 7/06 381/98 |

FOREIGN PATENT DOCUMENTS

| | | |
|---|---|---|
| DE | 102016202247 A1 | 8/2017 |
| EP | 2765681 A1 | 8/2014 |
| EP | 3136406 A1 | 3/2017 |
| FR | 2732169 A1 | 9/1996 |
| JP | H09215211 A | 8/1997 |
| JP | 2012222956 A | 11/2012 |
| JP | 2018148723 A | 9/2018 |
| KR | 101727465 B1 | 4/2017 |
| KR | 101879656 B1 | 7/2018 |
| WO | 2010026805 A1 | 3/2010 |
| WO | 2013088238 A2 | 6/2013 |
| WO | 2014200024 A1 | 12/2014 |
| WO | 2015128450 A | 9/2015 |
| WO | 2016132695 A1 | 8/2016 |
| WO | 2016/147598 A1 | 9/2016 |

OTHER PUBLICATIONS

International Search Report and Written Opinion for PCT/EP2019/076145, dated Jan. 2, 2020, 10 pages.

* cited by examiner

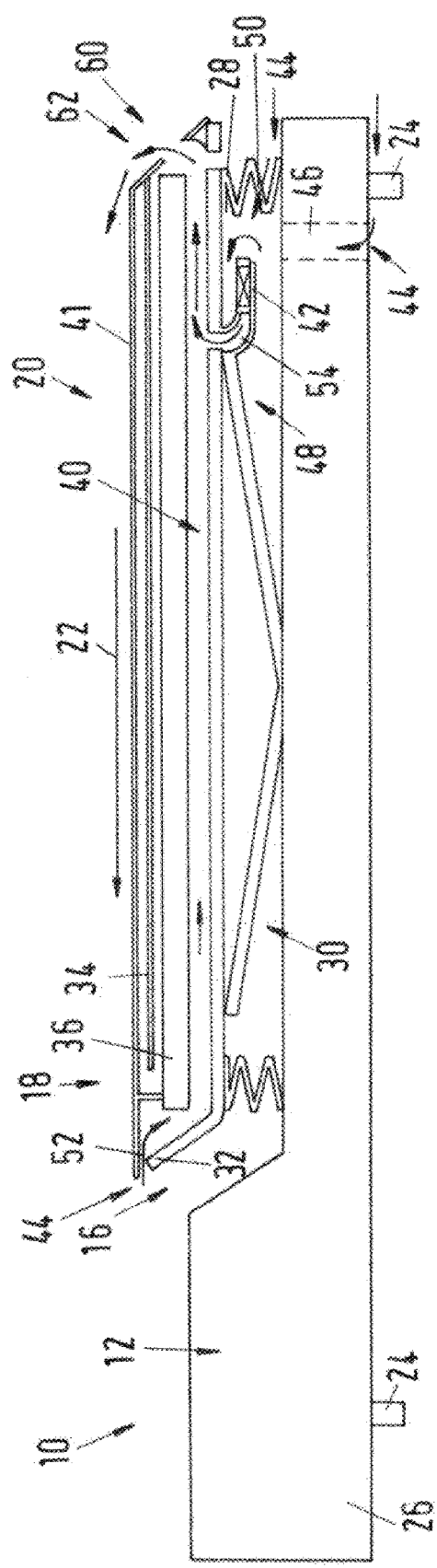
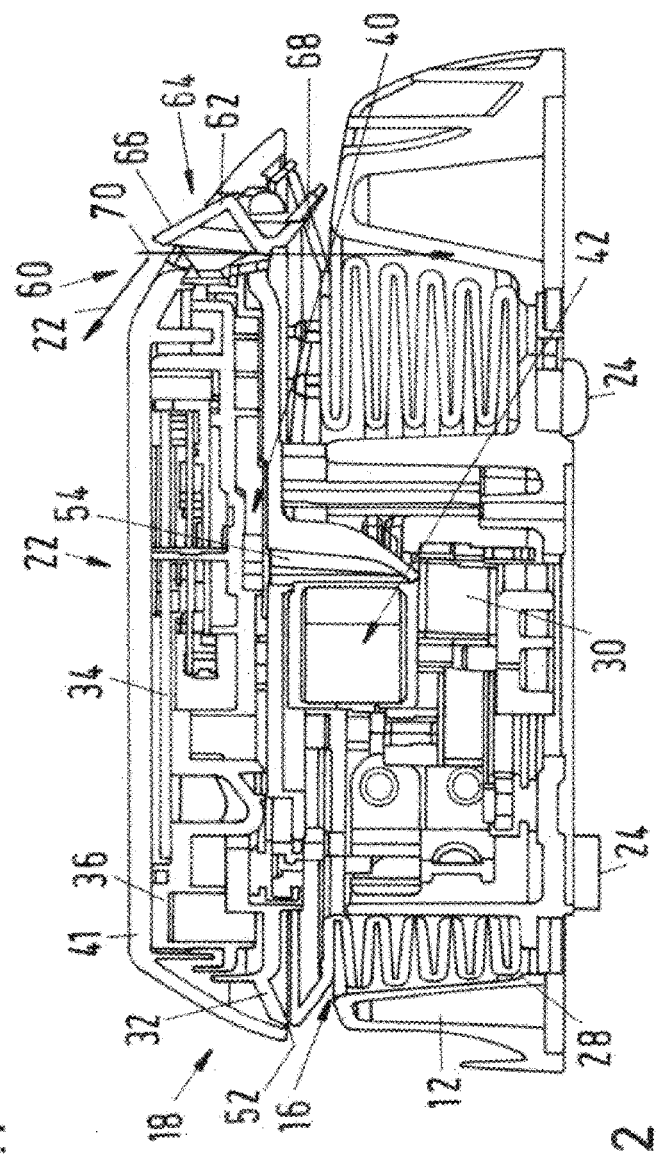

METHOD AND SYSTEM FOR COOLING OF AN INDUCTIVE POWER TRANSFER PAD

CROSS-REFERENCE TO RELATED APPLICATIONS

This application is a National Phase of PCT/EP2019/076145, filed Sep. 27, 2019, which claims priority to GB Patent Application No. 1815941.8, filed Sep. 28, 2018, the disclosures of which are hereby incorporated by reference in their entireties.

The invention relates to an inductive power transfer pad comprising an airflow generating system, an arrangement for an inductive power transfer and to a method for cooling an inductive power transfer pad, in particular via an airflow.

Electric vehicles, in particular a track-bound vehicle, and/or a road automobile, can be operated by electric energy which is transferred by means of an inductive power transfer. Such a vehicle may comprise a circuit arrangement, which can be a traction system or a part of a traction system of the vehicle, comprising a receiving device adapted to receive an alternating electromagnetic field and to produce an alternating electric current by electromagnetic induction. Furthermore, such a vehicle can comprise a rectifier adapted to convert an alternating current (AC) to a direct current (DC). The DC can be used to charge a traction battery or to operate an electric machine. In the latter case, the DC can be converted into an AC by means of an inverter.

The inductive power transfer is performed using two of conductor arrangements e.g. in the form of a first and second set of three-phase conductor windings. A conductor may generally be a cable. A first, primary side conductor arrangement or, in short, primary conductor arrangement is installed on the ground (primary conductor (or winding) arrangement or primary conductor (or winding) structure) and can be fed by a wayside power converter (WPC). The second conductor arrangement (secondary conductor (or winding) structure or secondary unit) is installed on the vehicle. For example, the second conductor arrangement can be attached underneath the vehicle, in the case of trams under some of its wagons. For an automobile it can be attached to the vehicle chassis e.g. at an underside thereof. The second conductor arrangement or, generally, the secondary side is often referred to as pick-up-arrangement or receiver. The first conductor arrangement and the second conductor arrangement form a high frequency transformer to transfer electric energy to the vehicle. This can be done in a static state (when there is no movement of the vehicle) and in a dynamic state (when the vehicle moves).

For inductive power transfer, inductive power transfer pads comprising a stationary part and a movable part are known from the state of the art. WO 2015/128450 A1 discloses an inductive power transfer pad comprising a stationary part and a movable part, wherein the movable part comprises a primary conductor arrangement, wherein the movable part is movable between a retracted state and an extended state by being lifted away from the stationary part (extended) or moved close to the stationary part (retracted). In the extended state, an air gap between the primary conductor arrangement and the secondary conductor arrangement is reduced (compared to the retracted state). In the retracted state, the dimensions of the inductive power transfer pad are reduced (compared to the extended state). Accordingly, the inductive power transfer pad may form less of an obstacle when compared to the extended state.

The movable part of such inductive power transfer pads may comprise at least one electronic housing wherein electronic components are located, such as MOSFETs. These electronic components create heat. Moreover, heat may concentrate within the (reduced) air gap between movable part and the secondary side (e.g. formed by the vehicle to which power is inductively transferred to). In both cases, a risk of damaging components of the inductive power transfer pad due to overheating may occur. The present invention, however, is not limited to inductive power transfer pads comprising movable parts but e.g. also covers inductive power transfer pads having non-movable conductor arrangements or at least non-movable primary conductor arrangements.

In addition or alternatively, inductive power transfer pads may comprise at least one coil of an electric line and the at least one coil may be adapted to receive or produce the electromagnetic field which transfers energy to a counterpart. In case the at least one coil receives the electromechanical field, an electric voltage is induced in the coil or coils. In particular, the present invention relates to electric power transfer pads of this kind. During operation of the at least one coil, i.e. while the electromagnetic field is produced or received during energy transfer, an electric current is flowing through the respective coil and heat is produced.

So far, it has been considered sufficient to dissipate the heat occurring in or at inductive power transfer pads e.g. by way of heat conduction or heat radiation into the surroundings. Yet, it has been discovered that this may not be sufficient in all scenarios.

The objective of the present invention is to improve the dissipation of heat in connection with an inductive power transfer pad.

This object is solved by a device, an arrangement and a method according to the attached independent claims. Advantageous embodiments are defined in the dependent claims. Moreover, the features mentioned in the introductory part of the description may individually or in any combination thereof also be provided in the presently disclosed solution, if not mentioned otherwise or evident.

According to a basic idea of the invention, the inductive power transfer pad is configured to generate an airflow during the inductive power transfer (but optionally also before and after that), said airflow being directed into the surroundings. For example, the airflow may be directed from the inductive power transfer pad into the surroundings, thereby removing heated volumes of air which may e.g. accumulate during the inductive power transfer close thereto. For example, such heat accumulations may occur in a space or air gap between the inductive power transfer pad and a secondary unit. Additionally or alternatively, the airflow may be used to remove air from the interior of the inductive power transfer pad by conveying it into the surroundings. This can also create an effect of sucking in air from the surroundings which replaces the air removed from the interior of the inductive power transfer pad. This way, an airflow through the inductive power transfer pad (and in particular at least through a movable part thereof) may be created which provides a cooling effect.

Specifically, an inductive power transfer pad is suggested, comprising a conductor arrangement for generating or receiving an electromagnetic field during an inductive power transfer (i.e. being either a primary or a secondary conductor arrangement), and an airflow generating system that is configured to generate an airflow during an inductive power transfer, said airflow being directed into the surroundings of the inductive power transfer pad.

The conductor arrangement may be configured according to any of the previously discussed known examples and e.g.

comprise a set of three conductors that are (in case of being a primary conductor arrangement) energisable by individual (i.e. conductor-specific) alternating currents, said currents being preferably phase-offset from one another.

The airflow generating system may comprise an airflow generating unit, such as a fan, a pump, or a general pressure-difference generating means, in order to generate the airflow. As will be detailed below, the airflow generating system may also comprise ducts, channels, airflow guiding structures, airflow inlet portions and/or airflow outlet portions or in general any element for generating and/or guiding the airflow in a desired manner.

The surroundings may generally be formed by the surroundings in which the inductive power transfer pad is placed, e.g. the surroundings at a servicing station, a workshop, a garage, a road section or a parking spot. Of course, during an inductive power transfer, to e.g. a vehicle, these surroundings may be at least partially be formed and occupied by the vehicle and/or the secondary unit thereof.

The airflow may be directed from the interior of the inductive power transfer pad into the surroundings or from an outside portion of the inductive power transfer pad into the surroundings. A direction of at least part of the airflow may be chosen so as to be directed away from the inductive power transfer pad. Additionally or alternatively, a direction of at least part of the airflow may be chosen so as to be directed along a portion of the inductive power transfer pad (e.g. along an outer side or outer surface thereof e.g. facing the further device and/or along an upper side of a movable part).

In general, the airflow may be formed by and/or defined as a volume flow of air that is generated by the airflow generating system.

At least part of the airflow may be directed into the surroundings in a substantially orthogonally manner, e.g. compared to plane comprising an airflow outlet portion discussed below and/or compared to a cross-section of said airflow outlet portion. This way, the airflow may be directed towards an opposite vehicle or another device comprising a conductor arrangement and may e.g. be diverted thereby in a preferred manner (for example so as to flow along at least a portion of an outer side or outer surface of the inductive power transfer pad and/or along an upper side of the movable part).

According to an embodiment of the inductive power transfer pad and the method, a flowing direction of at least part of the airflow flowing into the surroundings is tilted with respect to a plane comprising or extending in parallel to the conductor arrangement and/or with respect to a plane extending orthogonally to a moving axis noted above. Additionally or alternatively, the plane may comprise at least one of: an airflow outlet portion discussed below, an upper side of a movable part or a plane in which or in parallel to which a movable part and stationary part extend. Also, the plane may correspond to or extend in parallel to a horizontal spatial plane. Note that the conductor arrangement is three-dimensional but typically has a plane in which its windings and/or its meandering course is mainly or fully formed. Said plane may be referred to as the plane of the conductor arrangement.

Further, the plane may extend in parallel to or comprise a space (i.e. an air gap) between the inductive power transfer pad and a device comprising a further conductor arrangement for the respective other of the generating or receiving the electromagnetic field. Still further, for an inductive power transfer, the inductive power transfer pad may transfer the power (e.g. with reference to a magnetic field line with the largest magnetic flux) in a direction extending orthogonally to said plane.

The flowing direction may e.g. be in the plane or may enclose an angle of at least 40°, at least 60°, at least 75° or at least 80° with the plane.

When referring to at least a part of the airflow in this disclosure, said part may comprise a volume share of said airflow of for example at least 20%, at least 40%, at least 60% or at least 80% of the overall volume of said airflow (e.g. with reference to a defined time span and the total air volume comprised by the airflow during said time span and e.g. flowing through a defined cross-section such as the airflow outlet portion).

Due to being tilted, the airflow may be directed in a preferred manner, in particular so as to achieve a flow along at least a portion of the inductive power transfer pad (in particular along the upper side of a movable part). Additionally or alternatively, the tilting may help to direct the airflow towards a further unit or a further device comprising a further conductor arrangement in order to be deflected thereby in a preferred manner (e.g. so as to flow through an air gap between the movable part and said secondary unit).

In this context, the flowing direction may be tilted towards an (preferably opposite) edge portion (or as synonymously used herein: edge region) of the inductive power transfer pad and in particular of an optional movable part. Differently put, during operation, the flowing direction may be tilted towards an edge portion of the inductive power transfer pad. Specifically, the airflow may start from and/or enter into the surroundings at a defined portion of the inductive power transfer pad and in particular a movable part, for example an edge portion or a central portion. Due to being tilted towards an edge portion, it may be ensured that the airflow at least partially flows along of the inductive power transfer pad, thereby removing heated air that may have locally accumulated. In one example, the inductive power transfer pad (and in particular a movable part or at least its upper side) has at least two pairs of opposite edge portions, e.g. by being designed with a rectangular or polygonal shape or footprint.

In one example of the inductive power transfer pad and the method, at least part of airflow is directed towards a device comprising a conductor arrangement that is configured for the respective other of generating or receiving the electromagnetic field (e.g. a device that is to be inductively charged by the power transfer pad or a device that inductively charges a device comprising the inductive power transfer pad). Said device, such as a vehicle, may e.g. comprise a secondary unit. As noted above, this way the device may be used to deflect the airflow in a desired manner, e.g. so as to be guided along at least a portion of the inductive power transfer pad and in particular of an optional movable part thereof and/or through an air gap between the inductive power transfer pad and the device, thereby removing heated air accumulated therein. This represents a simple and efficient way of directing the airflow in a desired manner, without e.g. having to necessarily adapt or position the airflow outlet portion in a desired or complex manner.

According to further embodiment of the inductive power transfer pad and the method, at least part of the airflow is directed so as to at least partially flow along an outer portion of a side or surface of the inductive power transfer pad facing a device comprising the conductor arrangement that is configured for the respective other of generating or receiving the electromagnetic field (e.g. along the upper side of an optional movable part). This may include directing the airflow in such a manner so as to when e.g. streaming out of an airflow outlet portion, a part thereof directly flows along a portion of the said side. Additionally or alternatively, the same may be achieved by directing at least part of the airflow to a deflecting structure, such as to the device, the deflecting structure than deflecting the airflow so as to guide it along said side. This way, heat accumulating at or adjacent to said side may effectively be removed, thereby avoiding damages e.g. to the inductive power transfer pad.

Note that in a generally known manner, the device comprising the further conductor arrangement may generally be arranged oppositely to the inductive power transfer pad at least during the inductive power transfer.

In a further development of the inductive power transfer pad and the method, the airflow generating system comprises an airflow outlet portion for directing the airflow into the surroundings. The airflow outlet portion may comprise at least one opening to the surroundings, wherein a normal of the cross-section of said opening may define a flowing direction of the airflow that is directed into the surroundings. Additionally or alternatively, the flowing direction may be defined or at least influenced by a flap discussed below.

The airflow outlet portion may be connected to an interior space of the inductive power transfer pad (e.g. formed by or comprising a duct, a channel, a free space or the like) through which it least part of the airflow flows towards the surroundings. This may be relevant for embodiments discussed below in which the airflow also partially extends or flows through the interior of the inductive power transfer pad, for example to remove heat generated by interior electric components thereof and/or heat generated by at least one electric current flowing through at least one coil of an electric line.

In one example, the airflow outlet portion is located at the movable part. This way, the airflow may be positioned close to the device comprising the further conductor arrangement and/or close to the air gap between said device and the movable part.

Specifically, the airflow outlet portion may be located at or adjacent to the upper side of the movable part or generally an outer side or outer surface of the movable part facing the device comprising the further conductor arrangement (that is configured for the respective other of generating or receiving the electromagnetic field). Still further, the airflow outlet portion may be located at an edge portion of said outer side or outer surface. In this case, it may be particularly preferred to direct at least part of the airflow to an opposite edge portion, so as to cover a large area of the movable part and/or the outer side or outer surface with the airflow. Additionally, the airflow may be widened so as to also reach other edge portions than the opposite edge portion, e.g. edge portions extending at an angle (e.g. orthogonally) to the edge portion comprising the airflow outlet portion. This as well helps to cover a large area by means of the airflow, thus allowing for an effective heat removal.

Moreover, the airflow outlet portion may comprise a flap that is movable between a closed and at least one open state (or, differently put, between a closed and opened setting or between a closed and opened position). In the closed state, the flap may prevent the airflow from being directed into the surroundings (i.e. the airflow not reaching the surroundings and/or not leaving an interior space of the inductive power transfer pad). In the open state, the contrary may apply and the airflow may be directed into the surroundings e.g. without being significantly obstructed by the flap. The closed state may particularly be assumed in inactive states of the inductive power transfer pad (e.g. in non-transferring states and when not generating or receiving an electromagnetic field). Also, the movable part may be retracted when assuming the closed state. The open state may particularly be assumed in active states of the inductive power transfer pad (e.g. when conducting an inductive power transfer and/or when generating or receiving an electromagnetic field). In this case, the movable part may be extended.

By means of the open state, generating an effective airflow can be achieved. To the contrary, by providing a closed state, it can be prevented that foreign (particulate) matter, such as dirt or dust, enters the airflow outlet portion, thereby possibly reaching interior space of the inductive power transfer pad. Thus, the flap may generally be selectively closed in cases when no inductive power transfer is to take place, so as to avoid a risk of interior pollution of the inductive power transfer pad. On the other hand, it may selectively be opened (and kept open) in cases when an inductive power transfer is to take place in order to compensate for the heat generated during this process.

The flap may be movable (or may move) between the opened and the closed state in accordance with or, differently put, as a function of a movement of the movable part. As noted above, in the extended state of the movable part, the flap may be opened, and in the retracted state, the flap may be closed. The change between the opened and closed state may be at least indirectly caused by the movement between the extended and retracted state and/or generally take place during such a movement. For example, the forces generated in this context and/or the occurring relative movements may be used to also open or close the flap. For example, a portion of the flap may be selectively brought into contact with or be selectively exposed to forces generated during said movement, so as to achieve the change between the closed and the open state. This generally helps to reduce the complexity of the system and to reliably ensure that the flap is opened and closed as the need arises.

It is generally contemplated that a change between the closed and open state of the flap may be achieved without a dedicated actuator (i.e. without an actuator whose main purpose is to provide forces and/or movements for achieving said change). Rather, the forces and/or movements generated by the actuator for causing the movement of the movable part may be used to open and close the flap as well. Thus, the flap may be designed as a passive system which opens and closes only in response to other elements or units acting thereon, such as a biasing member, a bellow or a region of the stationary part as further discussed below. However, providing an actuator for the flap is equally possible in the context of this invention.

Specifically, for moving the flap between the opened and closed state, the flap may be configured to selectively rest against the stationary part (e.g. to achieve the closed state) or to be lifted or moved away from the stationary part (e.g. to achieve the open state). For resting against the stationary part, the flap may be pulled or forced into contact therewith, e.g. when moving the movable part so as to assume the retracted state. For lifting the flap away from the stationary part, the movable part may be moved into its extended state, thereby increasing a distance between the flap and the stationary part. When resting against the stationary part (in particular against a frame or rim portion thereof), the flap may be tilted about a rotational axis so as to preferably assume its closed state. When being lifted away from the stationary part, the flap may rotate in an opposite manner, so as to preferably assume its open state.

Moreover, the flap may be configured to rest against at least one of a rigid portion of the stationary part and a bellow connecting the movable part and the stationary part. The bellow may generally be a deformable and/or an extendable and retractable bellow, that is extendable and retractable in accordance with extending and retracting the movable part. An upper lip or mounting portion facing or being connected to the movable part of said bellow may provide a portion against which the flap may selectively rest, thereby being forced preferably into its closed position. The rigid portion of the stationary part may be provided by a non-deformable portion, e.g. made of a metallic or plastic material. In one example, the rigid portion is provided by a frame or rim portion receiving and/or partially enclosing the movable part, at least when being in the retracted state.

According to a specific embodiment, the flap may consist of two components, a stiffer and a more flexible component. At least one of the components and in particular both components may be produced by injection moulding. The embodiment with the two components has the advantage that an elastically deformable element for compensating tolerances of the assembly may be combined with and/or may be integrated in the flap. Alternatively, the flap may be realized as a single elastically deformable part, for example made of rubber.

Additionally or alternatively, the flap may be biased into the open state. This may be achieved by the flap comprising at least one biasing member, e.g. in form of a spring. In one example, the biasing member is a torsion spring. For example, the biasing member may be a leg spring. One leg of the spring may at least selectively rest against e.g. the stationary part, a bellow or the flap, so as to selectively compress the spring and force the flap into its closed position when moving the leg in a defined manner. On the other hand, said leg return to its non-deformed state when moving the movable part into its extended state, thereby opening the flap. This further helps to reduce the complexity of the system, e.g. compared to providing an additional actuator for operating the flap, and helps to reliably open and close the flap as needed.

Still further, when being in the open state, a passage may be formed between the flap and an opening of the airflow outlet portion receiving the flap, said passage allowing for (particulate) matter, such as dirt or dust, to pass from a first region of the inductive power transfer pad to a further region. For example, a cross-section defined by the opening receiving the flap may be at least partially non-obstructed when the flap is in its open state and, in particular, may define a channel-like passage extending along a preferably linear axis along which matter may pass. Specifically, the passage may extend from an upper side of the movable part to an underside opposite the upper side and facing the stationary part. Thus, dirt or dust that has accumulated at or above the flap (e.g. by being entangled in an airflow guiding structure discussed below), may pass through the passage and thus be removed from the airflow outlet portion, so as to avoid obstructions.

According to a further embodiment of the inductive power transfer pad and the method, the flap (and/or the opening receiving the flap and/or or an air duct comprising said opening) comprises an airflow guiding structure for guiding at least part of the airflow into the surroundings in a defined manner (e.g. with a defined orientation). The airflow guiding structure may comprise at least one guide plate, deflector plate or baffle plate. In one example, the airflow guiding structure comprises a plurality of respective plates which are oriented differently from one another. Specifically, at or close to edge portions of the flap (or the opening), the plates may be tilted towards said edge portions and, in particular, tilted away from a central portion of the flap and/or a central plate of the airflow guiding structure. Differently put, the plates of the airflow guiding structure may be oriented so as to define a (preferably continuously) outwardly spreading or tilting arrangement when viewed from a central portion of the flap or opening to an outer edge portion thereof.

This way, but also by other airflow guiding structure not comprising plates, the airflow guiding structure may generally be configured to widen the airflow compared to a cross-section of the airflow outlet portion. Thus, it can be achieved that a large area is covered by the airflow in order to achieve an effective heat removal.

As previously noted, it may generally be preferred to direct at least part of the airflow to opposite edge portions of the inductive power transfer pad and, in particular, to a pair of opposite edge portions being preferably different from the edge portion at which flap is placed. These edge portions may extend at an angle to the edge portion comprising the flap. Such a widening of the airflow towards opposite edge portions may be achieved by means of the airflow guiding structure discussed above. Specifically, said airflow guiding structure may guide a part of the airflow to a first edge portion and another part to a second edge portion, said edge portions being preferably oppositely arranged to one another and preferably being different from an edge portion comprising the flap or an edge portion directly opposite the edge portion comprising the flap.

According to a further embodiment of the inductive power transfer pad and the method, the airflow generating system is configured to generate an airflow (or, differently put, generate the airflow in such a manner so as to extend) through at least part of the inductive transfer pad (and in particular at least part of a movable part) and into the surroundings of the power transfer pad. Differently put, the airflow generating system may be configured to generate an internal airflow within and/or flowing through at least part of the inductive power transfer pad. For doing so, it may be circulated within an interior space or, as detailed below, sucked in from outside to then be directed back into the surroundings again.

The interior space through which the airflow flows may comprise a space between a stationary and a movable part, which may e.g. be enclosed by a bellow preferably connected to both of the stationary and movable part. Within such as space, electrical components may act as heat sources. The present embodiment may thus help to remove heat from the interior space by way of the airflow and, preferably, guide or convey it into the surroundings instead.

In particular, the inductive power transfer pad may comprise a housing made of aluminum, wherein the housing conducts heat from the interior of the housing to the exterior of the housing. In addition, the housing may serve as a separation between a dry area of the pad and a wet area of the pad. Moisture and liquids, such as water, may enter the wet area of the pad from the surrounding of the pad. In particular, the separation may be made between the area of at least one electronic unit of the pad, which may control the operation of the pad, on one hand and the heat sink (i.e. the surrounding, in particular the surrounding of the pad). For example, a fan for forced airflow generation may be arranged in the exterior of the housing and/or in the wet area.

In particular in this context, the airflow generating system may be configured to generate an airflow from the surroundings into the inductive power transfer pad. For example, by means of a fan or a different pressure (difference) generating unit, air may be sucked into the interior space e.g. through at least one airflow inlet portion which is different from the airflow outlet portion described above. Moreover, it may flow through at least a portion of the inductive power transfer pad and then be directed back into the surroundings again. Thus, cooler air from the surroundings may be guided through inductive power transfer pad and/or heated air that has accumulated within the inductive power transfer pad may be transported out of the inductive power transfer pad. In both cases, an effective cooling of the inductive power transfer pad can be achieved. The airflow inlet portion and airflow outlet portion may generally be connected by a free space within the inductive power transfer pad and/or by dedicated passages or channels formed therein (e.g. being partially enclosed by a duct or pipe).

The inductive power transfer pad may generally comprise at least one air inlet portion, e.g. at an underside thereof facing the floor or the device at which it is mounted.

According to one example, the airflow from the surroundings may enter the inductive power transfer pad through at least one of the following (each representing an example of an airflow inlet portion):
- at least one opening in the stationary part, in particular at an underside thereof facing away from the movable part;
- at least one opening in a (preferably deformable and/or retractable and extendable) bellow connecting the movable part in the stationary part;
- at least one opening in the movable part, in particular between an outer cover and a structure of the movable part that is covered by said outer cover.

The openings may be provided in form of through holes, e.g. with a circular cross-section. Alternatively, the openings may be provided in form of slits or gaps. A diameter, length and/or width of the openings may be limited to a few millimeters, e.g. two less than 20 mm, less than 10 mm or less than 5 mm. This way, the risk of dirt entering the interior of the inductive power transfer pad can be reduced. This may not apply to openings at an underside of the stationary part. In this case, the risk of dirt entering the interior of the inductive power transfer pad may be limited by a small distance (of e.g. less than 20 mm, less than 10 mm or less than 5 mm) between the underside and a floor or mounting surface at which the stationary part is placed.

According to a further example of the inductive power transfer pad and the method, the airflow generating system comprises at least one fan, e.g. a centrifugal fan, or, differently put, a blower. The fan may comprise a rotating body with impellers to accelerate air, thereby generating the airflow. The fan may be positioned within a space or duct, that is connected to at least one airflow outlet portion and preferably also to an airflow inlet portion of the inductive power transfer pad (i.e. connected in a fluid-conductive manner or, in other words, such that air may be conveyed between the fan and said portions). The fan may represent a compact, reliable and cheap means to generate the desired airflow.

The fan may be configured to suck in air from the surroundings and convey said air back into the surroundings, thereby creating the airflow into the surroundings. When being positioned within the inductive power transfer pad, the air may also be guided through the inductive power transfer pad after being sucked in and e.g. conveyed towards an airflow outlet portion. The sucking-in effect may result from the fan locally accelerating a volume of air, thus creating a pressure difference as a result of which air is sucked or dragged towards the fan.

The fan may be positioned at an underside of the movable part facing the stationary part. The underside may e.g. be formed by a base plate discussed below. An opening or duct may extend through or be connected to the underside, so that air may pass to the upper side of the movable part and/or in a space between the base plate and an electric conductor arrangement (e.g. for producing and/or receiving an electromagnetic field) of the movable part as discussed below. This way a space efficient arrangement of the fan is achieved which effectively generates a desired airflow, in particular out of an interior space and towards an airflow outlet portion at an upper side of the movable part.

In a further embodiment of the inductive power transfer pad and the method, the airflow generating system comprises at least one airflow guiding structure for guiding the airflow within the inductive power transfer device towards the airflow outlet portion. The airflow guiding structure may comprise a duct, channel, passage and/or at least one baffle plate, deflector plate or guide plate. The airflow guiding structure may be configured direct the airflow from an optional airflow inlet portion to an airflow outlet portion and/or to a fan. Likewise, the airflow guiding structure may be configured to direct the airflow from the fan to the airflow outlet portion. By doing so, the airflow may be guided so as to effectively remove heat from regions close to heat sources and/or regions which are critical in terms of over-heating. Also, the airflow guiding structure may increase the degrees of freedom with regard to positioning the fan or a similar airflow generating means relative to e.g. an airflow outlet or inlet portion, since relative displacements therebetween may be compensated for by means of the airflow guiding structure (i.e. said structure allowing for guiding the air in a desired manner, thereby compensating for an offset between the relevant units and portions).

The inductive power transfer pad and, more precisely, the movable part may comprise a (free) space between the conductor arrangement (and in particular a bearing member of the conductor arrangement) and a base plate of the inductive power transfer pad (especially the base plate of a movable part). Accordingly, the airflow generating system may be configured to generate an airflow through a (free) space in e.g. the movable part and in particular between a conductor arrangement and the base plate of the movable part. The base plate may be made of a metallic material, such as aluminium. The base plate may provide an (electromagnetic) shielding effect, for at least partially shielding the surroundings from the electromagnetic field generated by the primary conductor arrangement. The base plate may carry a ferrite arrangement, so as to in a generally known manner guide the magnetic flux generated by the primary conductor arrangement.

Additionally or alternatively, the ferrite arrangement may be arranged close to the conductor arrangement or engage with the conductor arrangement or a (for example plate-shaped) bearing member of the conductor arrangement (i.e. extended into e.g. gaps of the conductor arrangement). The space may e.g. be formed by a gap or channel extending preferably orthogonally to the moving axis and along at least part of the conductor arrangement and/or base plate. In one example, the conductor arrangement and the base plate are generally placed at a distance from one another or at least one of the conductor arrangement and base plate comprising spacers (e.g. protrusions) for providing the space between said members.

The bearing member of the conductor arrangement may be made of a plastic material and generally of a non-metallic material. In general, the bearing member may serve to support and/or guide the conductor arrangement in a desired manner. For doing so, the bearing member may comprise receiving sections, e.g. in form of recesses or channels, for receiving at least sections of the conductor arrangement.

As indicated above, the fan may be positioned at an underside of the base plate and, by means of an airflow guiding structure (e.g. in form of a duct, opening or channel), may be configured to guide an airflow through said base plate and into the space between the base plate and the conductor arrangement. Note that the conductor arrangement may generally be positioned opposite to an upper side of the base plate.

The invention further relates to an arrangement for an inductive power transfer, comprising an inductive power transfer pad according to any of the previous or following aspects and a device comprising a conductor arrangement that is configured for the respective other of generating or receiving the electromagnetic field (e.g. a device to which power is to be inductively transferred to by means of the inductive power transfer pad). According to said arrangement, at least part of the airflow is directed (e.g. from the inductive power transfer pad) through a free space between the device and the inductive power transfer pad and/or directed towards said device, so as to be deflected thereby. The deflection may result in the guiding the airflow in a desired manner and especially towards and/or through at least a section of an air gap formed between e.g. a movable part of the inductive power transfer pad and the device. This may help to promote an effective cooling of the arrangement. Moreover, by making use of the device that is typically placed oppositely to the inductive power transfer pad for achieving the power transfer, a simple and cheap solution has been found to guide the airflow in a desired manner (i.e. no complex airflow guiding structure being necessarily required and/or more degrees of freedom being provided for positioning the airflow outlet portion, as the airflow guiding function is at least partially provided by the device).

The invention further relates to a method for cooling an inductive power transfer pad, the inductive power transfer pad comprising a conductor arrangement for generating or receiving an electromagnetic field during an inductive power transfer, and wherein the method comprises: generating an airflow during an inductive power transfer that is directed into the surroundings of the inductive power transfer pad.

The method may comprise any further step, any development or any further feature in order to provide any of the previously or subsequently discussed interactions, operating states and functions. Specifically, any of the previous or subsequent explanations and developments regarding the device-features may also apply to the equivalent method-features. In general, the method may be realised and/or carried out with an inductive power transfer pad or an arrangement according to any of the previous or subsequent aspects. Specifically, the method may further comprise deflecting the airflow towards and/or into an air gap formed between the inductive power transfer pad and a device comprising a secondary conductor arrangement.

For example, the method may comprise at least one of the following: directing at least part of the airflow towards a device comprising a conductor arrangement for the respective other of generating or receiving the electromagnetic field; guiding at least part of the airflow through a space (e.g. an air gap) between the inductive power transfer pad and said device; guiding at least part of the airflow along a surface of the inductive power transfer pad, said surface preferably facing said device; guiding at least part of the airflow through the interior of the inductive power transfer pad and in particular through a movable part thereof.

In the following, an embodiment of the invention will be described with reference to the attached schematic figures. Features which correspond to one another with regard to their type and/or function may be assigned the same reference signs throughout the figures. In the figures:

FIG. 1 shows a schematic cross-sectional view of an inductive power transfer pad according to an embodiment of the invention;

FIG. 2 shows a detailed cross-sectional view for showing how the schematically illustrated working principle of FIG. 1 can be put into practice;

In the following, an inductive power transfer pad 10 and an arrangement 11 according to an embodiment of the invention which carry out a method according to the invention will be described.

Figure 3:
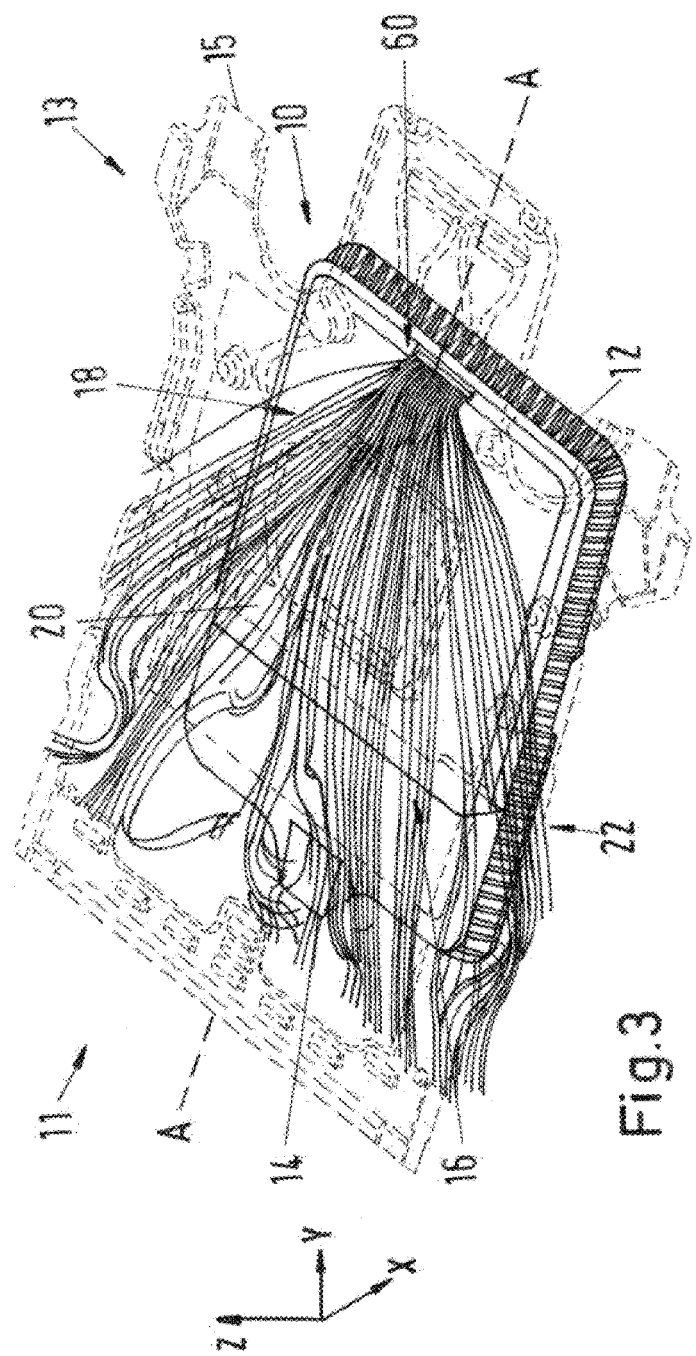
FIG. 3 illustrates the generated airflow during an inductive charging process of a secondary unit by means of an inductive power transfer pad according to FIG. 2.

In FIG. 3, an arrangement 11 is shown comprising a power transfer pad 10 comprising a primary conductor arrangement (not visible) and a device 13 comprising a secondary conductor arrangement (not visible). The device 13 is a vehicle, such as a car, of which only a section 15 of its underfloor is shown.

The basic design of the inductive power transfer pad 10 is known. Specifically, a floor-mounted stationary part 12 is shown having a connecting section 14 for receiving a power line and a rectangular recess 16 for receiving a movable part 18. The movable part 18 is rectangularly shaped as well and has an upper side 20 (i.e. an upper or outer surface) which faces the device 13 that is to be inductively charged.

Note that the inductive power transfer pad 10 could also be mounted to an underside of the device 13 and be extendable towards the floor. Additionally or alternatively, the device 13 could carry a primary unit and the inductive power transfer pad 10 could form a secondary unit. Also, the inductive power transfer pad 10 could be free of a movable part 18 or a movable conductor arrangement. In this case (but not limited thereto), the flap 62 discussed below could be opened and closed by an actuator acting on said flap 62.

In FIG. 3, a coordinate system is shown in which the x-y plane marks a horizontal spatial plane which is parallel to and/or contains e.g. a footprint of the stationary and movable parts 12, 18. The z-axis marks a vertical spatial axis (i.e. an axis of the gravitational forces, but oriented oppositely thereto) as well as a moving axis of the movable part 18. In FIG. 3, the movable part is shown in an extended state in which it inductively charges the device 13 and further provides an airflow 22 which is depicted by a plurality of thin lines. The direction of the power transfer (i.e. the magnetic field line with the largest magnetic flux) extends along the z-axis as well.

FIG. 3 also contains an axis A-A. FIG. 1 shows a schematic cross-sectional view of the power transfer pad 10 along said axis A-A, whereas FIG. 2 shows a more detailed cross-sectional view along an oblique cutting plane near the edge of the pad 10 shown on the right hand side in FIG. 3.

In FIG. 1, the floor mounted stationary part 12 can again be seen as well as its recess 16 for receiving the movable part 18. The stationary part 12 comprises cylindrical legs 24 at its underside facing the floor. Said legs 14 space a base member 26 of the stationary part 12 at a distance from the floor surface, thereby creating a gap or, differently put, a free space underneath the stationary part 12.

The movable part 18 and the stationary part 12 are connected to one another by a deformable below 28 which encloses an intermediate space between the movable stationary part 18, 12 and moves in accordance with an extension and retraction of the movable part 18 (i.e. is extended and retracted or, differently put, folded and unfolded accordingly).

A moving mechanism 30 which comprises a scissor lift as well as an actuator (not shown) assumes an extended state in FIG. 1, thus lifting the movable part 18 away from the stationary part 12 and out of the recess 16. The moving mechanism 30 is connected to an aluminium base plate 32 of the movable part 18. Said base plate 32 functions as a shield against the electromagnetic field generated and/or received by a primary conductor arrangement 36 of the movable part 18. Also, said base plate 32 may carry a non-illustrated ferrite arrangement for guiding the magnetic flux in a desired manner.

The primary conductor arrangement 36 is located above the base plate 32. Connecting means for connecting the primary conductor arrangement 36 with the base plate 32 are not shown in FIG. 1. There is a detector arrangement 34 above the primary conductor arrangement 36 for detecting any foreign object, in particular electrically conducting objects in the area above the pad 10 during energy transfer from the pad to the secondary side conductor arrangement (not shown). The detector arrangement 34 may comprise a printed circuit board realizing an electric circuit. The primary conductor arrangement 36, the detector arrangement 34 and the base plate 32 generally extend in parallel to one another as well as in parallel to a horizontal spatial plane and/or orthogonally to the moving axis z indicated in FIG. 3.

According to this embodiment of the present invention, there is a free space 40 between the base plate 32 and the primary conductor arrangement 36 that is created by non-specifically illustrated spacers between the base plate 32 and the primary conductor arrangement 36. Said space 40 acts as a passage or duct for an internal part of the airflow 22 discussed in the following.

The movable part 18 further comprises a cover member (outer cover) 41 made of a plastic material and forming the upper side 20 of the movable part 18. Said cover member 41 likewise extends largely in parallel to the base plate 32, primary conductor arrangement 36 and detector arrangement 34 and protects from environmental influences.

Moreover, an airflow generating system 37 is shown which, at an underside of the base plate 32, comprises a centrifugal fan 42. Said fan 42 creates an airflow 22 as indicated by the numerous arrows in FIG. 1. Specifically, the fan 42 is configured to suck in air from the surroundings of the inductive power transfer pad 10, such that an airflow 22 is created which flows through part of the interior of the inductive power transfer pad 10 and then back into the surroundings again in a defined (i.e. specifically oriented) manner. In particular, the fan 42 shall be waterproof, since it is arranged in the wet area of the pad 10. Preferably, the fan 42 or any other fan that is used in connection with the present invention is protected against intrusion of dirt and liquid, according to International Protection Marking 67.

For doing so, the inductive power transfer pad 10 comprises a number of air inlet portions 44. A first type of air inlet portion 44 is provided by at least one opening 46 at an underside of the stationary member 12. Said opening 46 (in form of a through-hole) forms a passage into an interior space 48 between the stationary part 12 and the movable member 18 (or more specifically its base plate 32) which is enclosed by the bellow 28. Due to the gap created by the spaces 42 between the floor and the base member 26 of the stationary part 12, air indicated by arrows in FIG. 1 can stream through the opening 46 into the interior space 48 or, more specifically, be sucked into said space 48 by means of the fan 42.

As also indicated by a respective arrow, air is also sucked into the interior space 48 through openings 50 in the bellow 28, said openings 50 also acting as air inlet portions 44.

A further type of air inlet portion 44 is provided by means of a gap 52 extending orthogonally to the plane of FIG. 1 and between the cover member 41 and the left outer edge portion of the base plate 32 in FIG. 1. Yet, the position of this gap (i.e. at which portion between the cover member 41 and the base plate 32 it is formed), is not a mandatory aspect. The gap 52 likewise allows for air to enter the inductive power transfer pad and specifically to enter the space 40 between the base plate 32 and the conductor arrangement 36. The air can thus stream towards the fan 42 which, in the shown example, is positioned at a remote portion or, differently put, close to an opposite edge of the movable part 18 compared to the gap 52.

At least the gap 52 and the openings 50 in the bellow 28 are dimensioned so as to limit the danger of dirt entering the interior of the inductive power transfer pad 10. For example, a width of the gap 52 is limited to not more than 20 mm and preferably not more than 10 mm, whereas a diameter of the openings 50 is limited to not more than 10 mm and preferably not more than 5 mm. The openings 46 at the underside of the stationary part 12 can, in comparison, be dimensioned with a larger size as the risk of pollution is reduced by the legs 24 which define the size of the gap between the floor and the underside of the stationary part 12. For example, the openings 46 may have a diameter or, if e.g. provided with a rectangular shape, a length or width of several centimeters, such as at least 5 cm or at least 15 cm.

Coming back to the fan 42, air that has entered the interior space 48 is conveyed by the fan 42 through an airflow guiding structure 54 in form of a channel (e.g. provided by a pipe) into the free space 40 and thus to the other side of the base plate 32. From there, it flows towards an air outlet portion 60 comprising a non-specifically illustrated flap 62 which will be discussed in further detail below (see e.g. FIG. 2). The air outlet portion 60 is positioned at a first edge portion of the movable part 18. As indicated by arrows at the upper side 20, the airflow 22 then continues by streaming along the upper side 20 towards an opposite edge region of the movable part 18, thus covering a large portion of the upper side 20. This way, heat can be removed from the interior space 48 of the inductive power transfer pad 10 as well as from the free space 40, thereby cooling the components of the inductive power transfer pad 10.

In FIG. 2, an example of an actual inductive power transfer pad 10 which is based on the workings principle schematically illustrated in FIG. 1 is shown. Again, the stationary part 12 is shown, comprising legs 24 at its underside. Also, the recess 16 is shown receiving the movable part 18 (at least when in its retracted position). Moreover, the bellow 28 can again be seen which, similar to the movable part 18, is extended in FIG. 2. Still further, the cover member 41, the detector arrangement 34, the primary conductor arrangement 36, and the base plate 32 of the movable part 18 are shown. Once again, the gap 52 between the cover member 41 and the base plate 52 can be seen, through which air can enter. Likewise, the free space 40 between these members allowing for an airflow through the movable part 18 is shown. Still further, the fan 42 at an underside of the base plate 32 as well as the airflow guiding structure 54 are shown, which allows air to pass into the free space 40. Note that the moving mechanism 30 is, compared to the schematic illustration of FIG. 1, rotated into the plane of the figures by 90° (i.e. rotated about a vertical axis by said amount).

Compared to FIG. 1, the flap 62 can now better be seen. First of all, it can be gathered that the airflow outlet portion 60 is indeed positioned at an outer edge region of the movable part 18 and, specifically, at an opposite edge region to the gap 52 (which, however, is not mandatory). Also, it can be seen that the airflow outlet portion 60 comprises an opening 64 in the cover member 41 receiving the flap 62. The flap 62 comprises an upper portion 66 which, in a closed state of the flap 62, closes the opening 64, thus blocking the passage between the free space 40 and the surroundings. The flap 62 further comprises a lower portion 68 which, as will be discussed below, interacts with the stationary part 12 to selectively open and close the flap 62 in accordance with a movement of the movable part 18. At a position between the upper and lower portion 66, 68, the flap 62 comprises non-specifically illustrated pins acting as connecting members which are received in the movable part 18 in a rotatable manner (e.g. in receiving sections within the base plate 32 or the cover member 41). The flap 62 can thus rotate about a horizontal spatial axis extending orthogonally to the plane of FIG. 2, thereby changing between its opened and closed state.

In the open state depicted in FIG. 2, the flap 62 allows for a passage of air from the inner free space 40 into the surroundings. Moreover, at least the upper portion 66 of the flap 62 comprises a non-specifically illustrated airflow guiding structure in form of a number of baffle plates. These are oriented so that the airflow 22 streaming out of the airflow outlet portion 60 is tilted with respect to a horizontal spatial plane and, at least partially, guided towards an opposite edge portion of the movable part 18. As discussed with respect to FIG. 1, this results in the airflow 22 flowing across a large area of the part 18 and specifically its upper side 20.

Moreover, as can be seen in FIG. 3, the airflow guiding structure of the flap 62 helps to widen the airflow 22 leaving the airflow outlet portion 60. Specifically, the airflow 22 is thus at least partially directed to edge regions of the movable part 18 which are opposite to one another but extend at an angle to the edge region at which the airflow outlet portion 60 is placed. Thus, the airflow 22 overall has a V- or triangular shape and a continuously increasing width starting from the airflow outlet portion 60. This way, a large area of the upper side 20 can be covered. For doing so, outer baffle plates within the flap 62 may be tilted towards the respective opposite edge regions in the direction of which the airflow 22 is widened. On the other hand, baffle plates in a central portion of the flap 62 (i.e. being located between said outer baffle plates) may be tilted by a lesser degree and/or be oriented in a straight manner.

Coming back to FIG. 2, it can be seen that when being positioned in an open state, a passage 70 is formed between the opening 64 and the flap 62. Said passage 70 extends substantially vertically and allows for dirt to pass in a vertical manner past the flap 62 to a region below of the movable part 18, thereby passing from the upper side 20 to an underside or even further below of the movable part 18. This helps to limit the risk of obstructing the flap 62 and/or reducing a cross-section of the airflow outlet portion 60 due to pollution, thereby obstructing the airflow 22.

Figure 4:
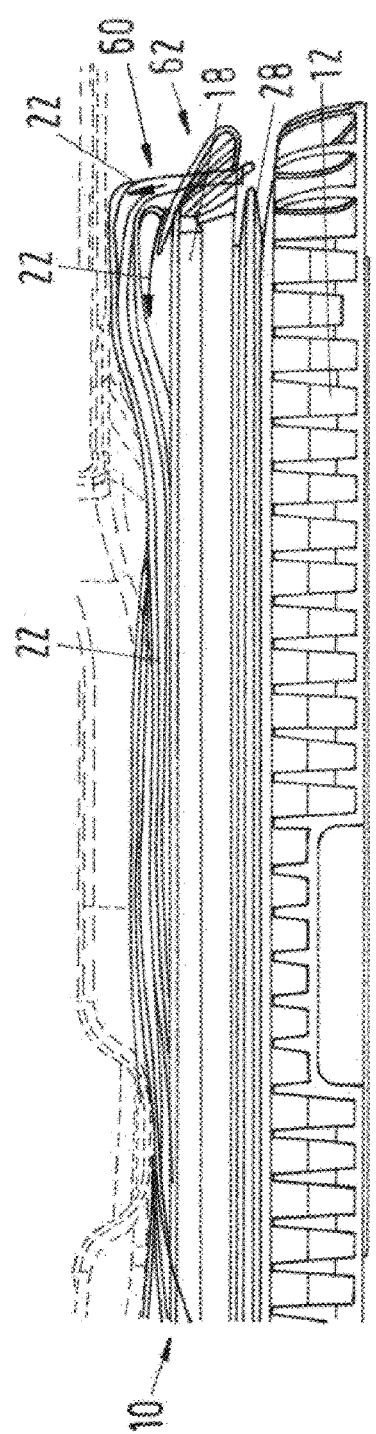
FIG. 4 is a detailed side of view of FIG. 3.

Referring to FIG. 4 in the following, a partial side view of the inductive power transfer pad 10 comprising the region in which the non-specifically illustrated flap 62 is positioned is shown. In FIG. 4, the stationary part 12, the movable part 18 and the bellow 28 extending therebetween are shown. Moreover, the direction of the airflow 22 after leaving the airflow outlet portion 60 is indicated.

First of all, it can be seen that at least part of the airflow 22 is directed so as to stream along the upper side 20 of the movable part 18. In addition, a further part of the airflow 22 is directed towards the device 13 e.g. at an angle of approximately 80° with respect to the horizontal spatial plane. Said part of the airflow 22 is deflected by the underside of the device 13 in such a manner, that it is directed towards an opposite edge region of the movable part 18 compared to the edge region at which the flap 62 is positioned. Overall, this means that the airflow flows through an air gap between the inductive power transfer pad 10 and the device 13, thereby removing heated air that may have accumulated in said gap. This further helps to cool the inductive power transfer pad 10 or at least limit temperature increases thereof, thus limiting a risk of overheating of its components.

Figure 5:
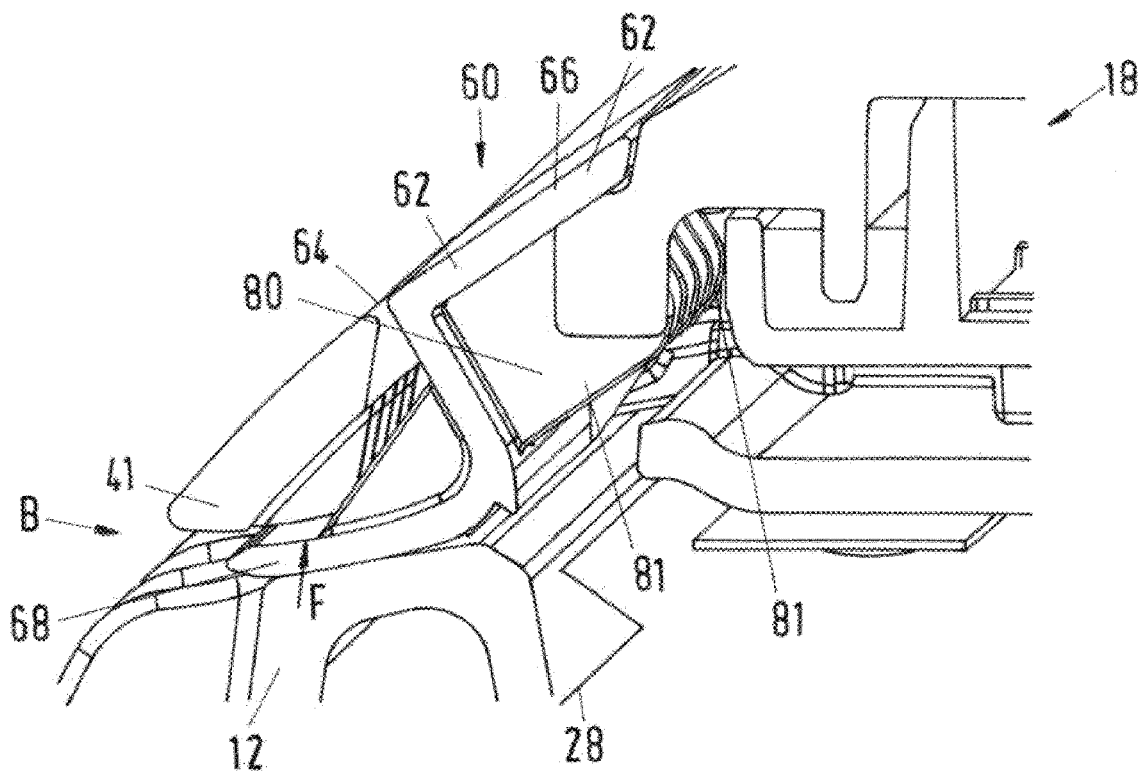
FIG. 5 is a detailed cross-sectional view showing a flap of the inductive power transfer pad according to FIG. 2 in a closed state.

Referring to FIGS. 5-8 in the following, the opening-closing mechanism of the flap 62 will be discussed in further detail. In FIG. 5, the flap 62 is shown in its closed state in which it fully blocks or obstructs an air passage through the opening 64 of the airflow outlet portion 60. It can be seen that with its lower portion 68, the flap 62 rests against the stationary part 12. This way, a force F is generated which rotates the flap 62 about its (in FIG. 5 non-visible) pins so as to assume the closed state. Note that in FIG. 5, the movable part 18 is in its retracted state in which it is pulled close to the stationary part 12. By doing so, the lower portion 68 of the flap 62 has been brought into contact with the stationary part 12.

It should be noted that the lower portion 68 is thus forced into contact with an inner side of the cover member 41 or, in other words, sandwiched between an upper rigid portion (e.g. a rim or frame portion) of the stationary part 12 and an inner side of the cover member 41. This represents a general aspect of the invention which is independent from the further details of the embodiment discussed herein. Moreover, this advantageously provides a stabilising effect for the cover member 41 and, in the shown example, an outer edge portion thereof. This is helpful e.g. in case a vehicle is wrongly positioned above the inductive power transfer pad 10 or drives over it with at least one wheel.

On the other hand, it can be seen that the upper portion 66 of the flap 62 contacts a stop portion of the cover member 41 or, differently put, of an edge portion of the opening 64, thus limiting the amount by which the flap 62 can be rotated so as to assume its closed state.

Figure 6:
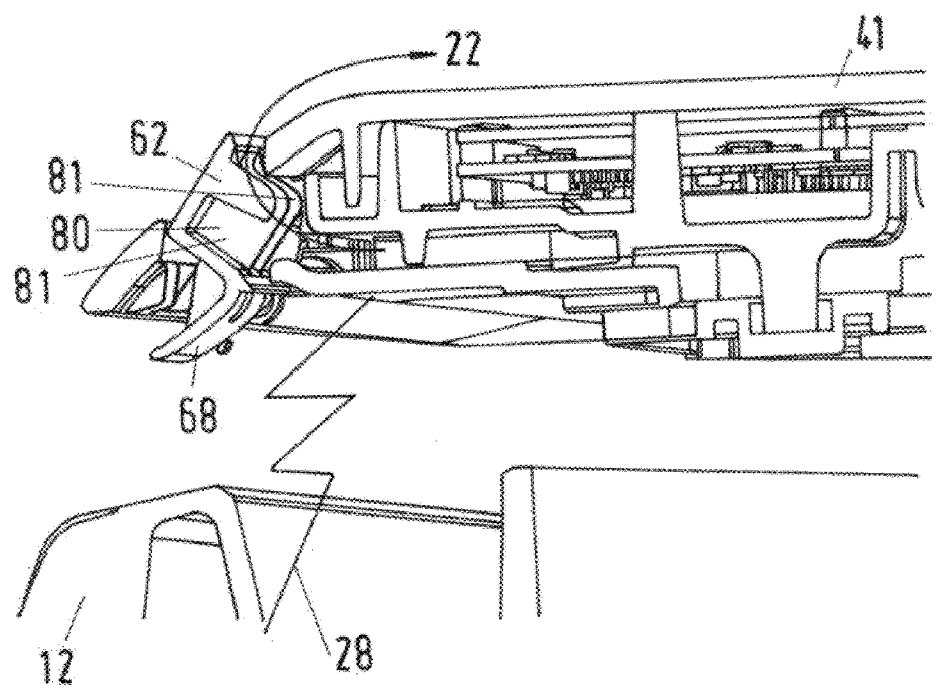
FIG. 6 shows the flap of FIG. 5 in an open state.

It should be noted that in FIG. 5 and also FIG. 6, the baffle plates 81 discussed above which form an airflow guiding structure 80 of the flap 62 are partially visible. Only some of said baffle plates 81 are marked with a respective reference sign.

Also, in the FIGS. 5 and 6, the bellow 28 is only schematically illustrated but, as noted above, actually encloses a space between the movable part 18 and the stationary part 12.

In FIG. 6, the movable part 18 is shown in its extended state similar to the previous FIGS. 1-4. It can be seen that the flap 62 thus assumes its open state. Specifically, the lower portion 68 has been lifted away from the stationary part 12, thus no longer being in contact therewith and not being forced against an inner side of the cover member 41. Due to being biased into its open state, the flap 62 immediately opens as soon as the force F indicated in FIG. 5 is no longer present i.e. as soon as the lower portion 68 has been lifted away from the stationary part 12. For the sake of completeness, an arrow is shown indicating the direction of the airflow 22 along the flap 62 and into the surroundings.

Figure 7:
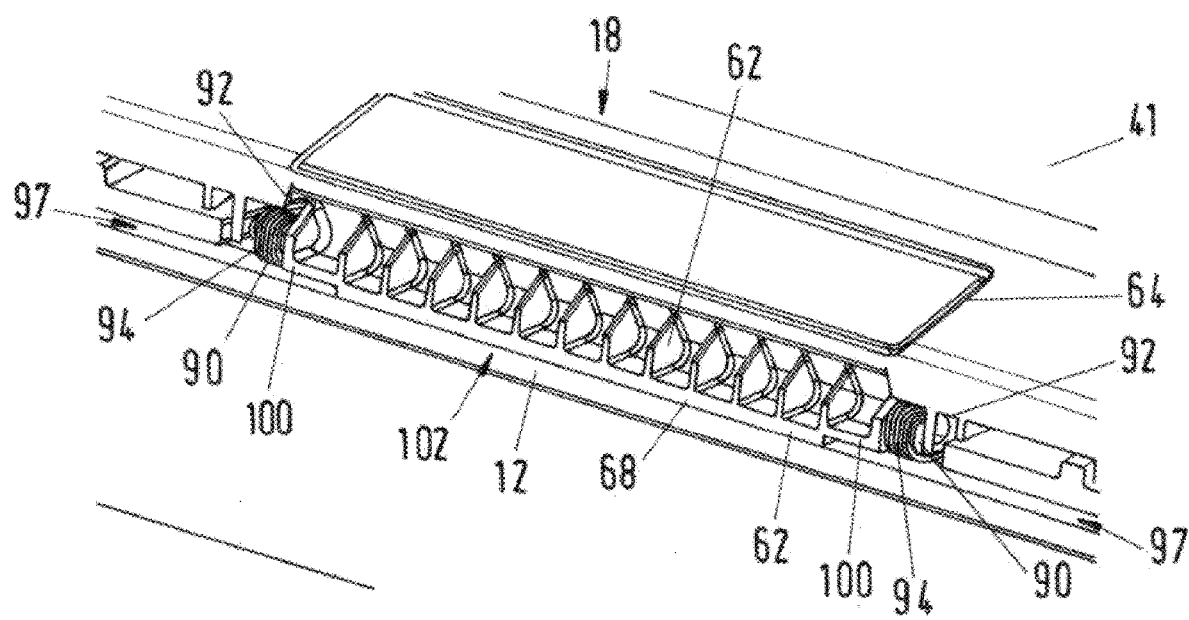
FIG. 7 is a view showing details of the flap of FIGS. 5 and 6.
Figure 8:
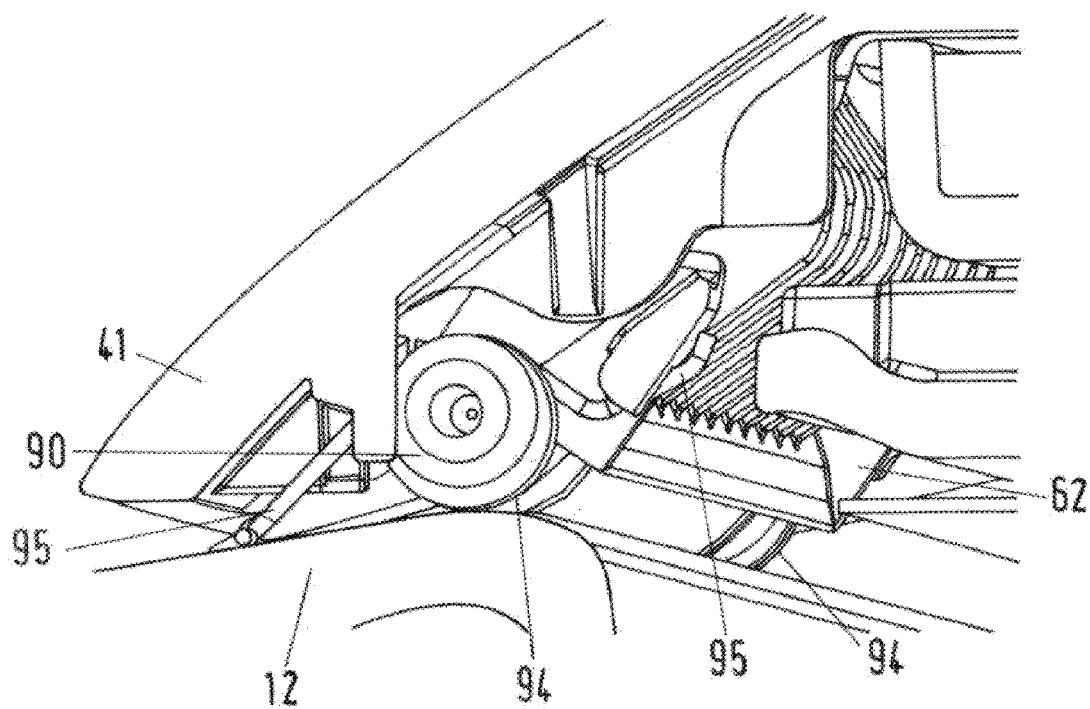
FIG. 8 shows the flap of FIGS. 5 to 7 being biased into an open position.

In FIG. 7, a rearview of the flap 62 is shown. The direction corresponds to arrow B of FIG. 5. It can be seen that at is left and right end portions, the flap 62 comprises the pins 90 which project horizontally and are received in receiving sections 92 on an inside of the cover member 41. At the pins 90, biasing members in form of leg springs 94 are placed (one leg spring 94 per pin 90). As indicated in FIG. 8, one leg 95 of each leg spring 94 contacts an inner portion of the flap 62, thus biasing it into its open position. However, in the retracted state of the movable part 18 as shown in FIGS. 7 and 8, the lower portion 68 of the flap 62 contacts the stationary part 12, thereby creating a momentum based on the force F of FIG. 5 acting against the biasing force of the leg springs 94.

In summary, the flap 62 can be thus opened and closed in accordance with or as a function of a movement of the movable part 18 and without a dedicated actuator. Instead, the flap 62 is designed as a passive system which, due to being selectively brought into contact with the stationary part 12 or by being lifted away therefrom, is opened and closed without additional force or movement generating actuators directly acting on the flap 62.

Finally, in FIG. 7 it can be seen that the lower portion 68 of the flap 62 directly rests against the stationary part 12. This, however, is not mandatory. Instead, an upper rim portion of the bellow 28 could extend along an upper portion of the movable part 12 and thus in between the flap 62 and the stationary part 12. Accordingly, the flap 62 can also rest against said rim portion of the bellow 28. A gap in which the upper rim portion of the bellow 28 would extend is indicated in FIG. 7 with reference sign 97.

Alternatively, the bellow 28 and specifically its rim portion could have a cut-out at the position where the flap 62 or at least its central portion 102 discussed below is located. This way, a free space could be provided so as to allow for a direct contact of the flap 62 and the stationary part 12.

As indicated in FIG. 7, the flap 62 and specifically an underside of the lower portion 68 facing the stationary part 12 can also be provided with a step-like design. More precisely, at at least one and preferably at both of the outer horizontal edge portions close to the pins 90, a step 100 can be provided so as to locally increase a distance with respect to the stationary part 12. Specifically, said step 100 can be dimensioned so as to not come into contact with the stationary part 12. Instead, said step 100 may overlap with a portion of the bellow 28 close to a cut-out for receiving a central portion 102 of the lower portion 68 of the flap 62, said central portion 102 being dimensioned for directly contacting the stationary part 12 when the movable part 18 is in its retracted state. Thus, a redundancy is created with regard to elements against which the flap 62 may rest (either the bellow 28 by means of the step(s) 100 and/or the stationary part 102). This helps to ensure that the flap 62 is reliably closed even in case of temperature deformations or unexpected tolerances of single components of the inductive power transfer pad 10.

The invention claimed is:

1. An inductive power transfer pad, comprising:
   a first conductor arrangement configured to generate an electromagnetic field or receive an electromagnetic field during an inductive power transfer;
   an airflow generating system that is configured to generate an airflow during an inductive power transfer, a pressure generating unit of the airflow generating system being configured to suck in air from the surroundings so that the air flows through an interior space of the inductive power transfer pad and directed back into the surroundings of the inductive power transfer pad through an airflow outlet portion, wherein the inductive power transfer pad is configured to direct at least a part of the airflow into the surroundings along a surface of the inductive power transfer pad which faces a second conductor arrangement during the inductive power transfer, the second conductor arrangement configured to:
   receive the electromagnetic field generated by the first conductor arrangement, when the first conductor arrangement is configured to generate the electromagnetic field, or
   generate the electromagnetic field to be received by the first conductor arrangement, when the first conductor arrangement is configured to receive the electromagnetic field.

2. The inductive power transfer pad according to claim 1, wherein a flowing direction of at least part of the airflow flowing into the surroundings is tilted with respect to a plane comprising or extending in parallel to the conductor arrangement.

3. The inductive power transfer pad according to claim 2, wherein, during operation, the flowing direction is tilted towards an edge portion of the inductive power transfer pad.

4. The inductive power transfer pad according to claim 1, wherein at least part of the airflow is directed so as to at least partially flow along an outer portion of the inductive power transfer pad and in particular along a surface of the conductor arrangement facing a device comprising a conductor arrangement that is configured for the respective other of generating or receiving the electromagnetic field.

5. The inductive power transfer pad according to claim 1, wherein the airflow generating system comprises at least one airflow outlet portion for directing the airflow into the surroundings.

6. The inductive power transfer pad according to claim 5, wherein the airflow outlet portion comprises a flap that is movable between a closed state and at least one open state.

7. The inductive power transfer pad according to claim 6, wherein the flap is biased into the open state.

8. The inductive power transfer pad according to claim 7, wherein the flap comprises an airflow guiding structure for guiding at least part of the airflow, wherein the airflow guiding structure is configured to widen the airflow compared to a cross-section of the airflow outlet portion.

9. The inductive power transfer pad according to claim 8, wherein the airflow guiding structure is configured to direct at least part of the airflow to opposite edge portions of the inductive power transfer pad.

10. The inductive power transfer pad according to claim 5,
wherein the airflow generating system comprises at least one airflow guiding structure for guiding the airflow within the inductive power transfer device towards the airflow outlet portion.

11. The inductive power transfer pad according to claim 1, comprising a stationary part, a movable part, and a moving mechanism for moving the movable part relative to the stationary part along a moving axis, and a flap,
wherein, for moving the flap between an open state and a closed state, the flap is configured to selectively rest against a stationary part or to be moved away from the stationary part.

12. The inductive power transfer pad according to claim 11,
wherein the airflow outlet portion is located at the movable part.

13. The inductive power transfer pad according to claim 12,
wherein the airflow outlet portion is located at or adjacent to an outer surface of the movable part, said surface facing the second conductor arrangement.

14. The inductive power transfer pad according to claim 11,
wherein the flap is movable between the open and the closed state in accordance with a movement of the movable part.

15. The inductive power transfer pad according to claim 14,
the inductive power transfer pad comprising a stationary part and a movable part that is movable relative to the stationary part, wherein the first conductor arrangement is the movable part,
wherein, for moving the flap between the open state and the closed state, the flap is configured to selectively rest against a stationary part or to be moved away from the stationary part.

16. The inductive power transfer pad according to claim 11,
wherein, during operation, the airflow from the surroundings enters the inductive power transfer pad through one of the following:
at least one opening in the stationary part, in particular at an underside thereof;
at least one opening in a bellow connecting the movable part and the stationary part; or
at least one opening in the movable part, in particular between an outer cover and a structure of the movable part that is covered by said outer cover.

17. The inductive power transfer pad according to claim 1,
wherein the airflow generating system is configured to generate an airflow through at least part of the inductive transfer pad and into the surroundings of the inductive power transfer pad.

18. The inductive power transfer pad according to claim 17,
wherein the airflow generating system is configured to generate an airflow from the surroundings into the inductive power transfer pad.

19. The inductive power transfer pad according to claim 1,
wherein the airflow generating system comprises at least one fan.

20. The inductive power transfer pad according to claim 19,
wherein the fan is configured to suck in air from the surroundings and convey said air back into the surroundings, thereby creating the airflow into the surroundings.

21. The inductive power transfer pad according to claim 1,
wherein the airflow generating system is configured to generate an airflow through a space between a primary conductor arrangement for generating an electromagnetic field during operation of the inductive power transfer pad and a base plate of the inductive power transfer pad.

22. An arrangement for an inductive power transfer, comprising the inductive power transfer pad according to claim 1; and the second conductor arrangement.

23. The inductive power transfer pad of claim 1, wherein the inductive power transfer pad comprises a stationary part and a movable part that is movable relative to the stationary part, wherein the first conductor arrangement is comprised by the movable part.

24. A method for cooling an inductive power transfer pad, comprising:
a first conductor arrangement configured to generate an electromagnetic field, or receive an electromagnetic field,
the method comprising:
sucking in air from the surroundings so that the air flows through an interior space of the inductive power transfer pad and directing the air back into the surroundings of the inductive power transfer pad through an airflow outlet portion of the inductive power transfer pad,
wherein at least a part of the airflow is directed into the surroundings along a surface of the inductive power transfer pad that is configured to face a second conductor arrangement during inductive power transfer.

25. The method of claim 24, wherein the inductive power transfer pad is configured to provide a first conductor arrangement generated electromagnetic field to the second conductor arrangement if the first conductor arrangement is configured to generate an electromagnetic field, or receive a magnetic field generated by the second conductor arrangement if the first conductor arrangement is configured to receive an electromagnetic field.

\* \* \* \* \*